(12) United States Patent
Carlson et al.

(10) Patent No.: US 6,954,770 B1
(45) Date of Patent: *Oct. 11, 2005

(54) RANDOM NUMBER GENERATOR

(75) Inventors: David A. Carlson, Haslet, TX (US); Gregg A. Bouchard, Round Rock, TX (US); Anand Varadharajan, Framingham, MA (US); Derek S. Brasili, Westminster, MA (US)

(73) Assignee: Cavium Networks, San Jose, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 09/938,166

(22) Filed: Aug. 23, 2001

(51) Int. Cl.[7] .............................. G06F 1/02

(52) U.S. Cl. ..................... 708/251; 708/252

(58) Field of Search .............. 708/250, 251, 708/252, 253, 254, 255, 256

(56) References Cited

U.S. PATENT DOCUMENTS

| | | |
|---|---|---|
| 4,905,176 A | 2/1990 | Schulz |
| 5,706,218 A | 1/1998 | Hoffman |
| 6,061,702 A | 5/2000 | Hoffman |
| 6,240,432 B1 * | 5/2001 | Chuang et al. ............ 708/252 |
| 6,480,072 B1 * | 11/2002 | Walsh et al. ................. 331/78 |

OTHER PUBLICATIONS

Federal Information Processing Standards Publication 180-1 Announcing the Secure Hash Standard, pp. 1-21, Apr. 17, 1995.
Jun and Kocher, "The Intel® Random Number Generator", Cryptography Research, Inc. White Paper Prepared for Intel Corporation, Apr. 22, 1999.
Hi/fn® 6500 Random Number Generator Analysis, AN-0011-00 Application Note, 1999.
FSB™ Cell Overview, RNG120 FSB, VLSI Technology, Inc. Rev. 1.1, 1999.

* cited by examiner

*Primary Examiner*—Chuong D Ngo
(74) *Attorney, Agent, or Firm*—Blakely, Sokoloff, Taylor & Zafman LLP

(57) ABSTRACT

A random number generator comprising an oscillator with an output signal dependant upon a random source, a sampling device to sample the output signal from the oscillator to obtain a sampled oscillator output, and a fixed frequency clock driven linear feedback shift register (LFSR) communicatively coupled to the sampling device via a digital gate to receive the sampled oscillator output, and to provide a random number at an output of the LFSR. Additionally, the random number generator may comprise an optional mixing function communicatively coupled to the LFSR to read the random number, and to insert the random number into an algorithm to obtain a robust random number.

20 Claims, 5 Drawing Sheets

RANDOM NUMBER GENERATOR

BACKGROUND

1. Field of the Invention

The present invention is related to the field of semiconductor circuits. In particular, the present invention is related to an apparatus for generating random numbers.

2. Description of the Related Art

Random number generation is critical to cryptographic systems. Symmetric ciphers such as data encryption standard (DES) require a randomly selected encryption key. Public-key algorithms like RSA, Diffie-Hellman, and DSA require randomly generated key pairs. Furthermore, the secure sockets layer (SSL) and other cryptographic protocols use random challenges in the authentication process to foil attacks.

Because of the widespread use of random numbers in cryptography, a random number generator must be robust enough so that even if the design of the random number generator is known, the random number generated by the random number generator cannot be predicted. Typically, a random number generator comprises an entropy generator to generate a seed that is then input into a mixing function (e.g., SHA-1, MD5 etc.). However, a large number of random number generators, actually utilize a deterministic process, i.e., a process whose outcome is predictable, to generate an output from an initial seed. This is true in the case of most software embodiments of random number generators. Such random number generators, (also called pseudo random number generators) can be easily compromised, particularly if the seed of the pseudo random number generator can be predicted.

Therefore, a seed generated by a true random number generator is essential for the proper functioning of a pseudo random number generator. A true random number generator (RNG) uses a non-deterministic source, such as, thermal or shot noise associated with a resistor, atmospheric noise, nuclear decay, or some such unpredictable natural process to generate a seed. Some random number generators use a natural process, i.e. the thermal or shot noise present when electrons flow through a resistor, to generate a seed. However, the RNGs of these circuits use analog circuitry that may include at least an operation amplifier and a voltage control oscillator to generate the seed. The use of analog circuits in the design of a RNG makes production of the RNG difficult. For example, due to the high voltage gain needed to amplify the thermal or shot noise, the output of the operation amplifier could become permanently saturated rendering the RNG useless.

Other RNGs use a low frequency clocked circuit to sample the output of a linear feedback shift register (LFSR), wherein the LFSR is driven by a higher frequency free running ring oscillator with a random variation in the frequency to generate random numbers. Due to the use of a low frequency clocked circuit to sample a higher frequency free running oscillator to generate random numbers, a failure of the free running oscillator is difficult to detect (i.e., one needs to monitor the output of the LFSR to determine if a predictable pattern is present). Moreover, RNGs that employ this design usually do not scale well as it is not obvious how to increase the amount of entropy i.e., the random binary bits generated.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

Described is a random number generator that comprises an entropy generator and a mixing function. In one embodiment, the entropy generator generates random binary bits (entropy bits) that may be used as a random number. In alternate embodiments, the entropy bits output from the entropy generator may be used as a seed in a mixing function to generate a robust random number. The entropy generator described herein may be used with any mixing function, and the mixing function described may be used with any entropy generator.

In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid obscuring the present invention.

In addition, it should be understood that the embodiments described herein are not related or limited to any particular hardware technology. Rather, the embodiments described may be constructed using various technologies (e.g., bipolar technology, complimentary-metal-oxide-semiconductors (cmos) technology, etc.) in accordance with the teachings described herein. Similarly, it may prove advantageous to construct a specialized apparatus to perform the teachings described herein by way of discrete components, or by way of an integrated circuit that uses one or more integrated circuit die that may be interconnected. Lastly, repeated usage of the phrase "in one embodiment" does not necessarily refer to the same embodiment, although it may.

Figure 1:
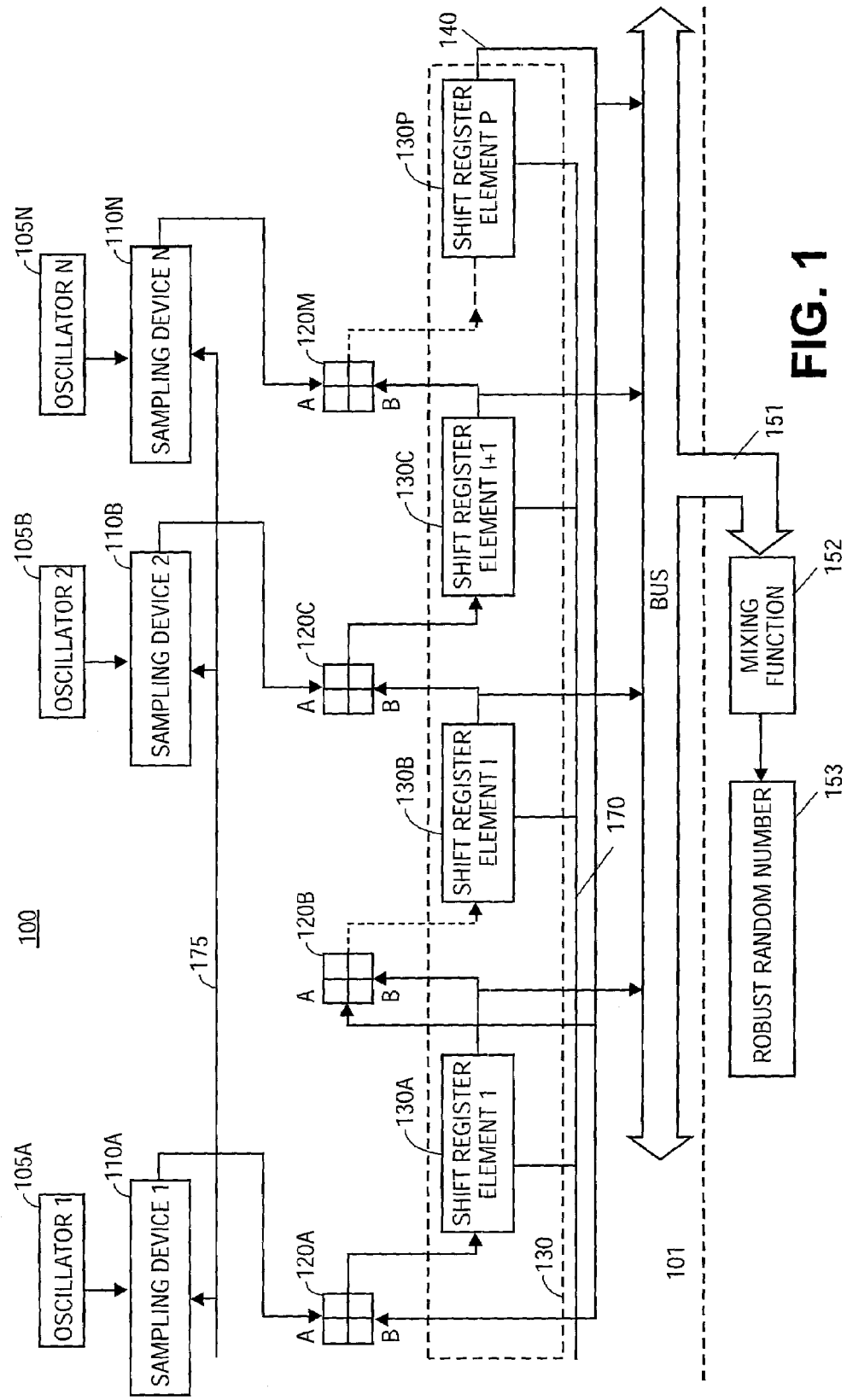
FIG. 1 illustrates a block diagram of one embodiment of a random number generator.

FIG. 1 illustrates a block diagram of one embodiment of a RNG. As illustrated in FIG. 1, RNG 100 comprises an entropy generator 101 and a mixing function 152. Entropy generator 101 comprises a set of one or more oscillators 105A–105N. Each oscillator in the set of oscillators generates a random frequency binary output signal. Thus, if any oscillator in the set of oscillators fails, the integrity of the RNG is not severely compromised.

In one embodiment, the output of each oscillator in the set of oscillators is coupled to a corresponding sampling device 110A–110N. Each sampling device synchronously samples each oscillator output. Each sampling device is a flip-flop (e.g., a S-R, T, J-K, or D flip-flop) that latches a random bit generated by the corresponding oscillator. In alternate embodiments, the sampling device may be formed using combinational logic gates. The output of each sampling device 110A–110N is coupled to one input (e.g., input A) of a different gate of a set of two-input gates 120A–120M. Each gate in the set of two-input gates is an exclusive OR gate. Thus, input A of the set of two-input gates 120A–120M is connected to a sampling device (see gates 120 A, C, and M respectively connected to sampling devices 11A, B, and N), to the output 140 of LFSR element 130P to form a feedback tap (e.g., gate 120B), or may be held low (i.e., a logic 0).

LFSR 130 is comprised of a set of shift register elements 130A–130P. Each shift register element may be a flip-flop (e.g., a S-R, T, J-K, or D flip-flop). The input B of the set of gates 120A–120M may be connected to the output of a shift register element (e.g., gates 120B,C, and M respectively connected to the output of shift register elements 130A, B, and C), or may be held low (i.e., logic 0 as long as input A of the same gate is not held to a logic 0). In one embodiment, the input B of a gate may be connected to the output 140 of LFSR element 130P while input A of the gate is connected to a sampling device (e.g., gate 120A). Alternately, the input B of a gate may be connected to the output 140 of LFSR element 130P (e.g., gate 120A) while input A of the gate may be held low (not shown). The output of each of the gates 120A–120M is coupled to the input of a different one of shift register elements 130A–P (see the output of gates 120A and C respectively connected to the input of shift register elements 130A and C). The dashed lines in FIG. 1 represent that one or more other gates and shift register elements may be present (see dashed lines between the gate 120B and shift register element 130B, and between the gate 120M and shift register element 130P).

In one embodiment, a polynomial (e.g., polynomial $x^{128}+x^{29}+x^{27}+x^2+1$) with few terms is chosen in the design of the LFSR so that few feedback taps are used in the design of entropy generator 101. The use of fewer feedback taps implies that fewer gates are used in the implementation of the LFSR. In one embodiment, after the output 140 of shift register element 130P is connected to the selected two-input gates to implement the polynomial, the sampling devices are connected to the two-input gates in an arbitrary manner.

In one embodiment, in order to generate a 64 bit random number, a RNG with 64 oscillators 105A–105N and (128) shift register elements 130A–130 P is used. However, one skilled in the art will appreciate that if (N) oscillators are used to generate a (K) bit random number wherein each oscillator generates (J) bits of entropy per clock cycle for (L) clock cycles, then N×J×L≧K.

In the LFSR 130 of FIG. 1, a fixed frequency clock 170 drives the shift register elements 130A–130P. Although, a second fixed frequency clock 175 drives the sampling devices 110A–110N, the same fixed frequency clock 170 may be used to drive sampling devices 110A–110N. In one embodiment, the fixed frequency clocks have frequencies that are lower than the nominal frequency of the oscillators.

Figure 2:
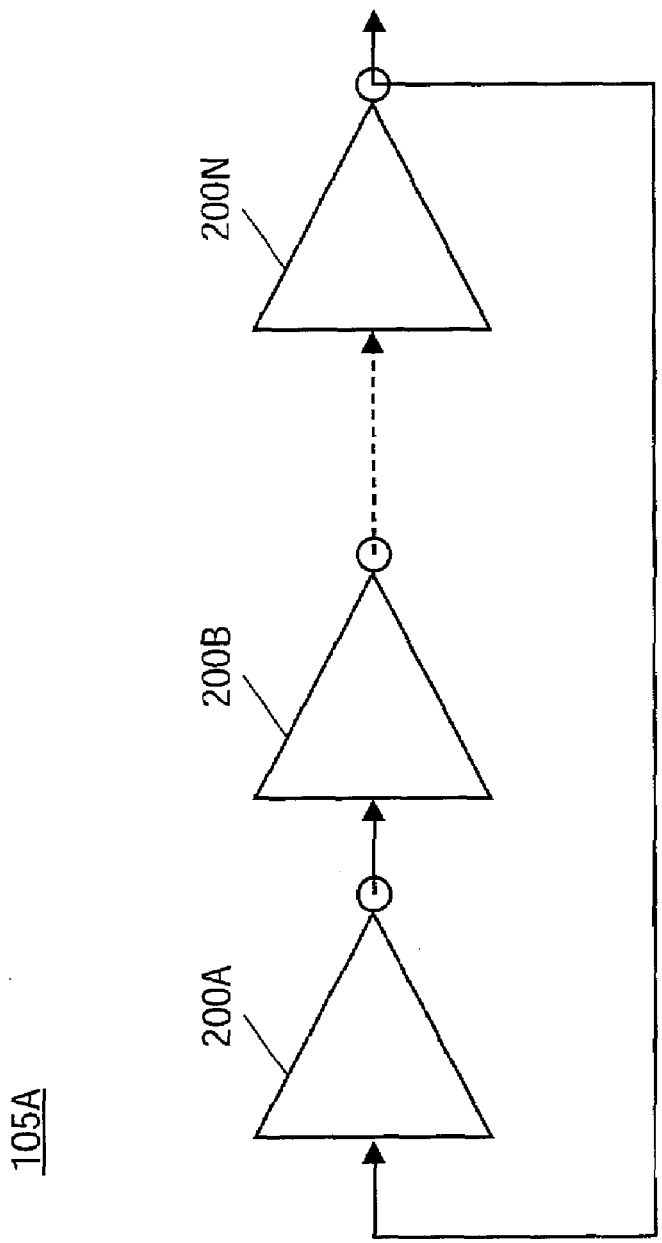
FIG. 2 illustrates one embodiment of an oscillator used in the entropy generator.

FIG. 2 illustrates one embodiment of an oscillator used in entropy generator 101. Oscillator 105A comprises a series of cascaded inverters (e.g., inverters 200A–200N) wherein the input of one inverter is connected to the output of the preceding inverter, and the output from the rightmost inverter 200N is fed back into the input of the leftmost inverter 200A. Each oscillator is designed to have a large jitter due to noise in the semiconductor junctions of the inverters. Therefore, physically small transistors are used in the design of the differential amplifiers. Due to the small physical size of the transistors used in the oscillator design, less power is consumed and the amount of jitter at the oscillator output increases.

While in one embodiment three inverters are used in the design of each oscillator 105A–105N, alternative embodiments use more inverters and/or different numbers of inverters in different ones of the oscillators 105A–105N (e.g., a different odd number of inverters, or wherein the number of inverters is a prime number). In one embodiment, each oscillator is tuned to the same nominal frequency. However, due to the random noise in the circuit the output of each oscillator fluctuates randomly. While in one embodiment each oscillator is tuned to the same nominal frequency, in alternative embodiments the oscillators are tuned to different nominal frequencies. In addition, while one embodiment is illustrated where the oscillators are implemented as in FIG. 2, alternative embodiments could implement one or more of the oscillators using different circuitry (e.g., a tank circuit).

Figure 3:
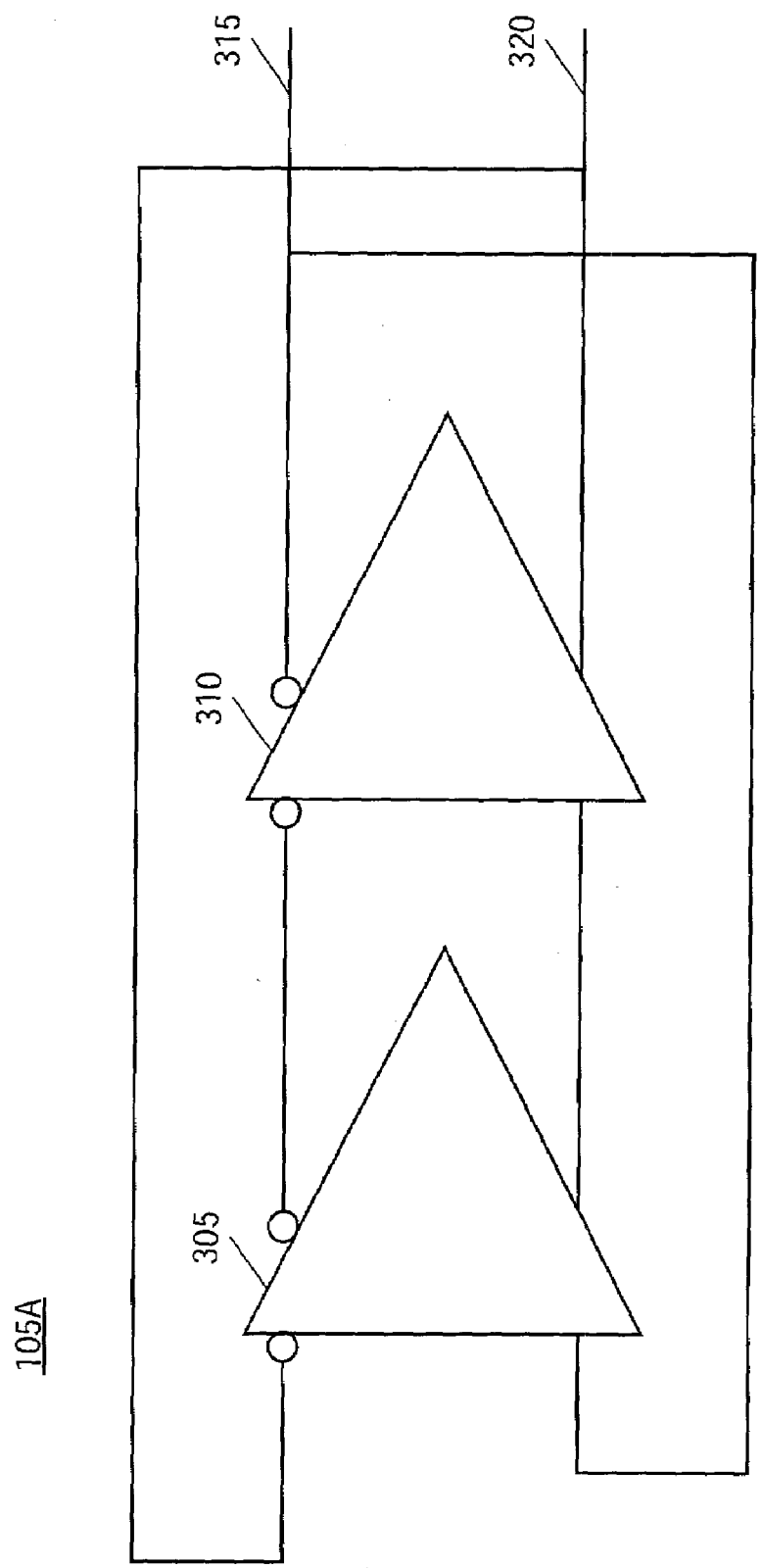
FIG. 3 illustrates one embodiment of an oscillator comprising a pair of differential amplifiers used in the entropy generator.

FIG. 3 illustrates one embodiment of an oscillator comprising a pair of differential amplifiers used in entropy generator 101. The oscillator 105A illustrated in FIG. 3 comprises a pair of differential amplifiers 305 and 310. Each differential amplifier has an inverting input and a non-inverting input, and an inverting output and a non-inverting output. The inverting output of differential amplifier 305 is connected to the inverting input of differential amplifier 310. The non-inverting output of differential amplifier 305 is connected to the non-inverting input of differential amplifier 310. However, the inverting input of differential amplifier 305 is connected to the non-inverting output of differential amplifier 310, and the non-inverting input of differential amplifier 305 is connected to the inverting output of differential amplifier 310. In one embodiment, the output for oscillator 105A is across terminals 315 and 320 of differential amplifier 310.

Each differential amplifier oscillator is designed to have a large jitter caused by the noise in the semiconductor junctions of the inverters. Therefore, physically small transistors are used in the design of the differential amplifiers. Due to the small physical size of the transistors less power is consumed and the amount of jitter at the oscillator output increases.

Returning to FIG. 1, the entropy bits generated by the LFSR may be sequentially clocked by clock 170 into a shift-register buffer (not shown). In one embodiment, 128 entropy bits are sequentially clocked from the output 140 of the LFSR into a shift-register buffer to form a random number. The random number stored in the shift register buffer may be used as a seed in a mixing function (described later) to generate a robust random number. Alternately, the entropy bits stored in the shift-register buffer may be used as a random number by itself without inserting the same as a seed into a mixing function.

In one embodiment, the output from each shift register element 130A-P is coupled directly to mixing function 152 via bus 151. The use of bus 151 eliminates the need for a shift-register buffer and speeds up the data input into the mixing function. In one embodiment, only 4 clock cycles may be used to input the 128 entropy bits into the mixing function. The entropy bits input as a seed into mixing function 152 may be used as a random number by itself without inserting the same as a seed into a mixing function.

Thus, it should be understood that the connection of the sampling devices 110A–N to different ones of the gates 120A–M is implementation dependent. For example, while FIG. 1 shows the first gate 120A connected to the first sampling device 110A, in alternative embodiments the first gate 120A may be connected to a later one of sampling devices 110B–N. As another example, while FIG. 1 indicates that there is a different number of gates 120A–M as compared to sampling devices 110A–N, alternative embodiments may have the same number of sampling devices and gates, and every one of the gates 120A–M is connected to a different one of the sampling devices 110A–N. As another example, while FIG. 1 indicates that there is a different number of gates 120A–M as compared to shift register elements 130A–P (there is not a gate between every shift register element, but the output of one shift register element may be directly connected to the input of the next shift register element in the LFSR), alternative embodiments may have a gate between every shift register element.

In alternate embodiments, two or more LFSRs may be cascaded to generate entropy bits that are input into the mixing function via bus 151. Thus, while FIG. 1 illustrates a single LFSR connected to bus 151, alternative embodiments may have two or more LFSRs connected to bus 151 (e.g., such LFSRs could use the same sampling devices outputs, but support a different polynomial; alternatively, such LFSRs could have their own oscillators and sampling devices; etc.). In the cascaded embodiment, the output 140 of one LFSR may be used to drive the clock inputs of each shift register element of the next LFSR.

As can be seen, the entropy generator 101 comprises predominantly digital circuits and has few analog components making components such as the oscillators 105A–105N easier to design. The entropy generator 101 has no single failure point because multiple oscillators are used in the design. Moreover, the entropy generator is scalable. If more entropy bits are needed the number of oscillators in the circuit are simply increased.

Figure 4:
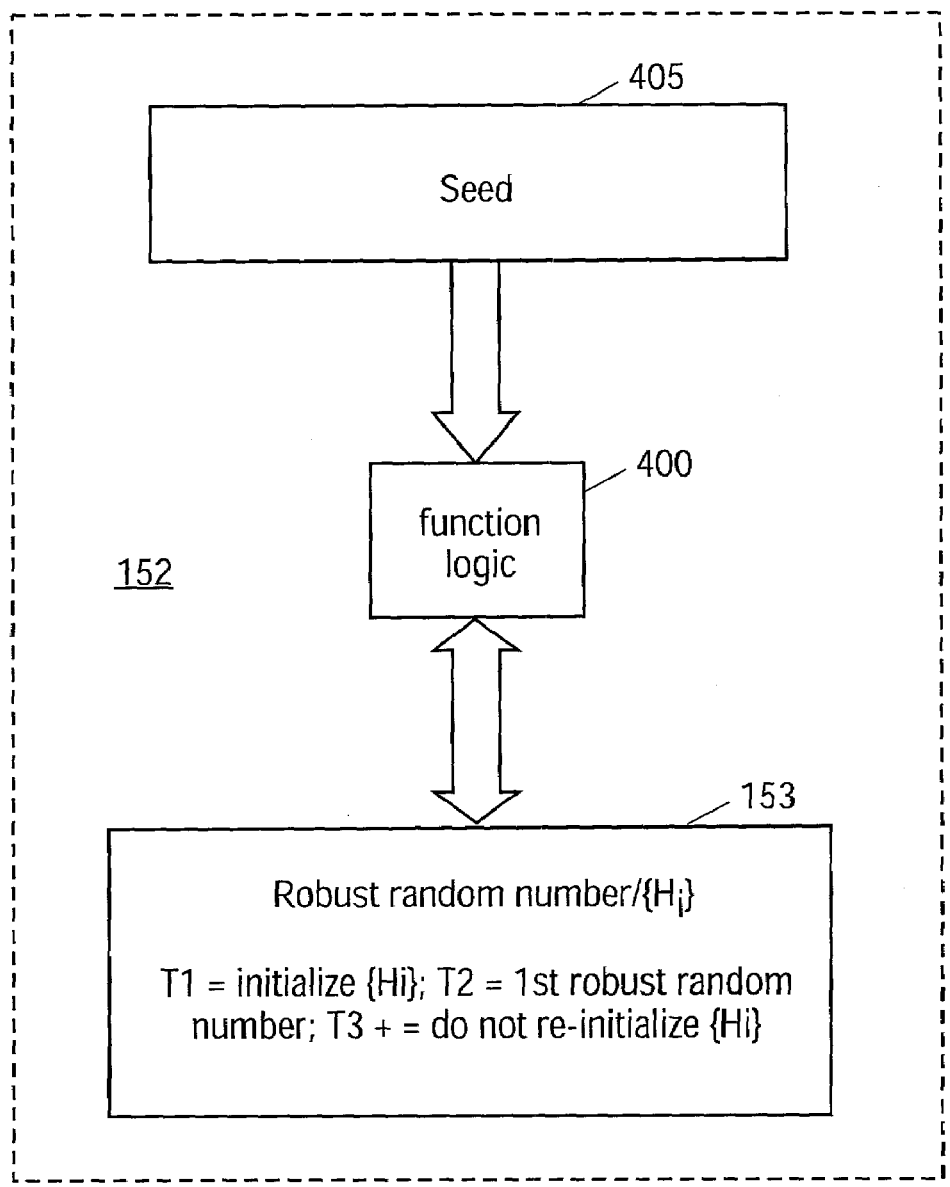
FIG. 4 illustrates a block diagram implementation of a mixing function or mixing algorithm.

FIG. 4 illustrates a block diagram implementation of a mixing function or mixing algorithm. The entropy bits generated by entropy generator 101 may be inserted into a mixing function or a mixing algorithm, (e.g., the SHA-1 or the MD5 algorithm) to destroy any residual statistical structure of the random number. The mixing function or algorithm may be implemented in hardware, (e.g., by a SSL/IPsec Processor manufactured by Caveo Networks of Cambridge, Mass.) software, or a combination of hardware and software.

In one embodiment, the mixing function is implemented using a modified SHA-1 algorithm. (A detailed specification of the SHA-1 algorithm may be found at the U.S. department of commerce's Federal Information Processing Standards Publication (FIPS) 180-1). In 405, the 128 entropy bits obtained from entropy generator 101 are segmented (e.g., into 4 segments of 32 bits each), and each segment is duplicated one or more times, concatenated, and padded as described in the SHA-1 specification to form a 512-bit input that is the seed 405 for function logic 400 that implements the SHA-1 algorithm.

After processing the 512-bit number through the SHA-1 algorithm, (e.g., using function logic 400) the 160-bit digest (i.e., the hash result 153) that is obtained represents a robust random number. While in one embodiment, the entire 160-bit hash result is used as a robust random number, in alternate embodiments a portion of the hash result 153 (e.g., 64 bits) may be used as a robust random number.

Prior to obtaining the robust random number 153, the SHA-1 algorithm specification (see FIPS publication 180-1) requires that the buffer containing particular words (i.e., the $\{H_1\}$ words) be initialized with a particular set of initialization words. After processing the 512-bit number through the SHA-1 algorithm, the buffer that originally contained the initialized $\{H_1\}$ words, now contain the robust random number 153. Thus, according to the SHA-1 specification, for each new robust random number 153 generated, the $\{H_i\}$ words must be initialized.

In one embodiment, since the buffer that originally contained the $\{H_i\}$ words contain the robust random number after processing the SHA-1 algorithm, for subsequent robust random number calculations the $\{H_1\}$ words are not initialized as required by the SHA-1 specification, but rather, the contents of the buffer that contain the robust random number 153 are left undisturbed from the previous calculation. Thus as illustrated in FIG. 4, at T1 the $\{H_1\}$ words are initialized, at T2 the first robust random number is obtained, and from T3 onwards, for subsequent robust random number calculations, the $\{H_1\}$ are not initialized. Moreover, even for the initial robust random number calculation (i.e., at T1) the buffer containing the $\{H_1\}$ words are not initialized with the particular set of initialization words required by the SHA-1 specification, but rather, the buffer containing the $\{H_1\}$ words is initialized with a randomly selected set of initialization words (e.g., with the entropy bits generated by entropy generator 101).

For subsequent robust random number calculations, all or part of the previous robust random number obtained (i.e., the hash result 153) is used to initialize the $\{H_1\}$ words when the next robust random number is generated. The new entropy bits from bus 151 are duplicated, concatenated and padded as described above to form a 512-bit number that is input into the SHA-1 algorithm. By not initializing the $\{H_i\}$ words for each robust random number calculation, the design of the hardware circuit that implements the mixing function is simplified, resulting in a saving in processing time. Furthermore, a feedback line that would otherwise feed back the last random number generated by the mixing function, to form at least part of the next 512-bit input for the next robust random number calculation is eliminated.

Figure 5:
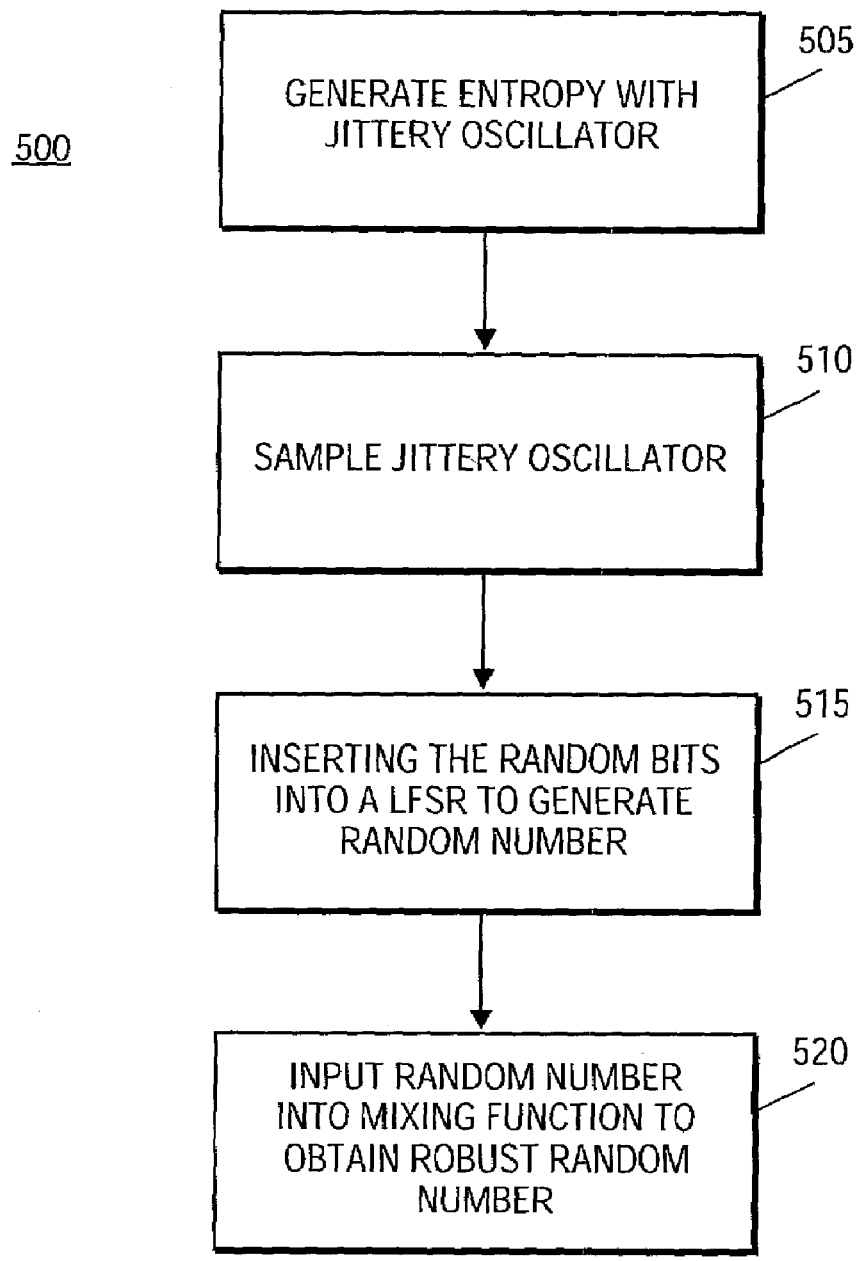
FIG. 5 is a flow diagram illustrating the operation of a random number generator according to one embodiment of the invention.

FIG. 5 is a flow diagram illustrating the operation of a random number generator according to one embodiment of the invention. As illustrated in FIG. 5, at 505, a plurality of oscillators with high jitter generate binary bits in a random manner. At 510, the bits generated by the plurality of oscillators with high jitter are sampled (i.e., latched by sampling devices). At 515, the latched random bits are input into a LFSR (i.e., by a fixed frequency clock). In one embodiment, the output from each shift register element in the LFSR may be used as a random number. At 520, the output from the LFSR is input (e.g., via bus 151) into a mixing function or algorithm, (e.g., a mixing function that implements the SHA-1 algorithm) to obtain a robust random number.

Thus a method and apparatus have been disclosed for generating a random number. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
an oscillator with an output signal dependant upon a random source, the oscillator comprising at least two inverters;
a sampling device to sample the output signal from the oscillator to obtain a sampled oscillator output; and
a fixed frequency clock driven linear feedback shift register (LFSR) communicatively coupled to the sampling device via a digital gate to receive the sampled oscillator output, and to provide a random number at an output of the LFSR.

2. An apparatus as in claim 1, further comprising:
a processor communicatively coupled to the LFSR to read the random number, and to insert the random number into an algorithm to obtain a robust random number.

3. An apparatus as in claim 2, wherein the algorithm is a SHA-1 algorithm.

4. An apparatus as in claim 2, further comprising the processor to duplicate the random number at least once, the processor to concatenate the duplicated random numbers prior to inserting the concatenated duplicated random number into the algorithm, wherein subsequent robust random number calculations do not require initialization of any variables.

5. An apparatus as in claim 1, wherein the sampling device comprises a flip-flop.

6. An apparatus as in claim 1 wherein the digital gate coupling the LSFR to the sampling devise comprises an exclusive—OR gate.

7. An apparatus as in claim 1, wherein the random source comprises at least one of shot noise, and switching noise from electrical components within the apparatus.

8. An apparatus as in claim 1, wherein the fixed frequency clock driven LFSR is coupled to the sampling device and to the output of the LFSR via the digital gate.

9. An apparatus as in claim 1, wherein the apparatus is implemented on an integrated circuit chip.

10. A method comprising:
generating random binary bits;
sampling and latching the generated random binary bits;
inserting the generated random binary bits into a fixed frequency clock driven linear feedback shift register (LFSR) via a digital gate to generate a random number;
duplicating the generated random number at least once;
concatenating the duplicated random numbers; and
inserting the generated random number into an algorithm to obtain a robust random number.

11. A method as in claim 10, wherein the algorithm is a SHA-1 algorithm.

12. A method as in claim 11 wherein the SHA-1 algorithm is initialized the first time the robust random number is generated.

13. An apparatus comprising:
a plurality of random oscillators each generating a random binary output signal, that includes at least a first oscillator and a second oscillator;
a plurality of sampling devices including at least a first sampling device and a second sampling device, wherein the first sampling device samples the output from the first oscillator and the second sampling device samples the output from the second oscillator; and
a fixed frequency clock driven linear feedback shift register (LFSR) that receives the sampled binary output signal from the first sampling device and the second sampled device to generate a random number.

14. An apparatus as in claim 13 further comprising a processor communicatively coupled to the LFSR to read the random number and to insert the random number in an algorithm to obtain a robust random number.

15. An apparatus as in claim 14, wherein the algorithm is a SHA-1 algorithm.

16. An apparatus as in claim 14, further comprising the processor to duplicate the random number at least once, the processor to concatenate the duplicated random numbers prior to inserting the concatenated duplicated random numbers into the algorithm.

17. An apparatus as in claim 13 wherein each oscillator in the plurality of oscillators comprises at least two inverters.

18. An apparatus as in claim 13, wherein each sampling device in the plurality of sampling devices comprises a flip-flop.

19. An apparatus as in claim 13, wherein the LFSR receives the sampled binary output signal from the first sampling device and the second sampled device via a first exclusive OR gate and a second exclusive OR gate.

20. An apparatus as in claim 13 wherein each random oscillator responds to at least one of shot noise and switching noise to generate a random frequency binary output signal.

* * * * *